Patented Jan. 24, 1928.

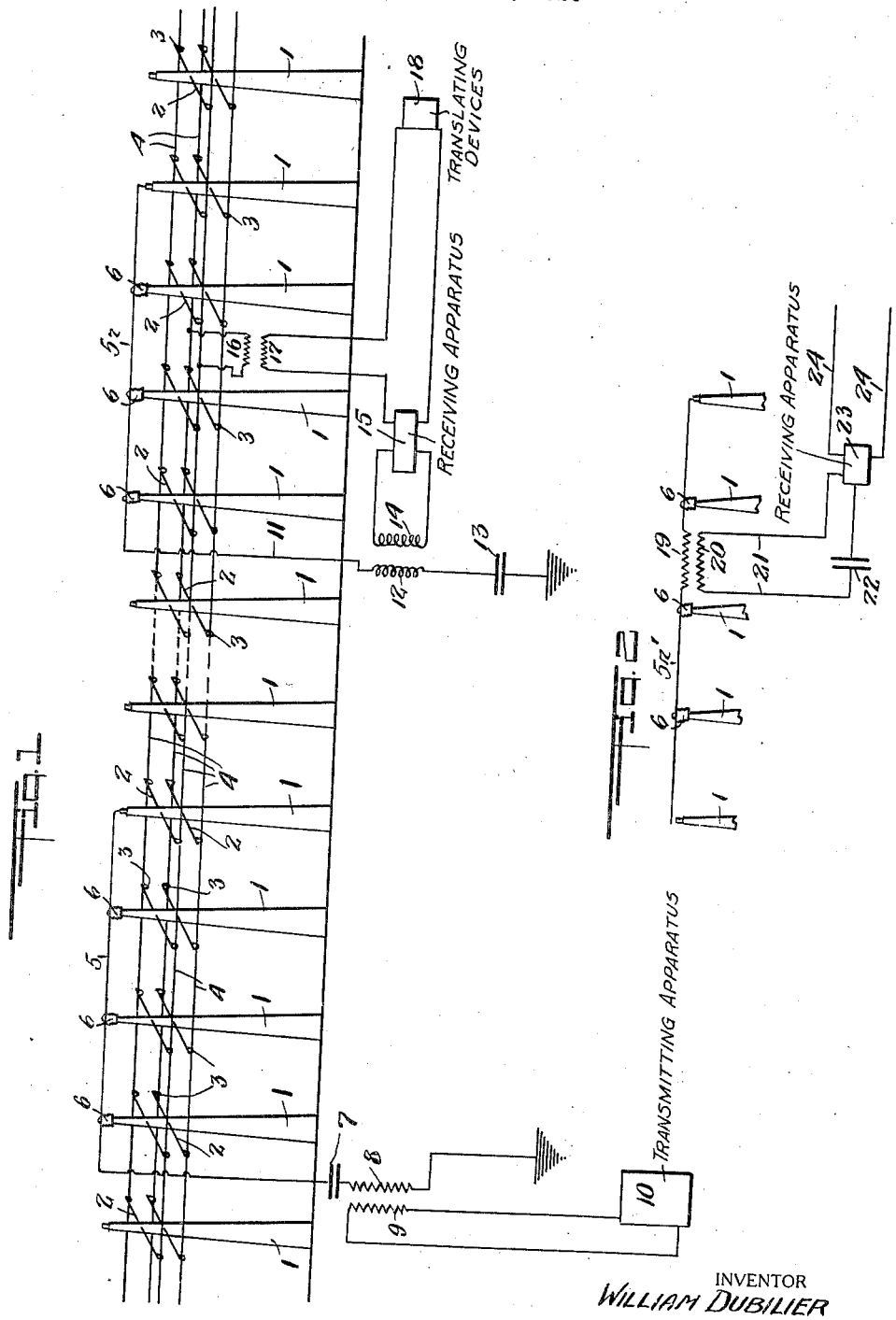

1,657,248

UNITED STATES PATENT OFFICE.

WILLIAM DUBILIER, OF NEW YORK, N. Y., ASSIGNOR TO DUBILIER CONDENSER CORPORATION, OF NEW YORK, N. Y., A CORPORATION OF DELAWARE.

CARRIER-WAVE COUPLER.

Application filed September 3, 1924. Serial No. 735,564.

This invention relates to improvements in electrical apparatus for transmitting signals, intelligence or power for other uses; and especially a coupling device to enable impulses to be sent and received over power lines without interfering with the transmission of electrical energy thereon, to serve the usual purposes for which said lines are constructed.

An object of the invention is to provide a simple device which can be mounted in operative relation to a power line carrying high tension currents and by which electrical energy in the quantity and form required by my invention can be superimposed upon the power line without in any way disturbing the function of the line, or the transmission over the same of all the electrical energy which it is adapted and intended to carry from the point where it is generated to the point where it is consumed in producing the effects desired.

The nature of the invention will appear from the following description taken with the accompanying drawings, and the novel features of the invention are recited in the appended claims. But the drawings illustrate only one form in which my invention can be embodied, and I reserve the right to make changes which come within the scope and principle of the invention, as defined by the broad and general meanings of the terms in which the appended claims are expressed.

On the drawings,

Figure 1 shows diagrammatically, an arrangement of parts by which the objects of my invention can be gained; and Figure 2 presents a detail of a modification.

In the particular description of what the drawings present, I use the numeral 1 to indicate a number of supports or posts, bearing a number of cross arms 2 near the top, these arms having at their outer ends insulators 3 to which the conductors 4 of the power line are secured. Power lines of this type are now in common use. The line may comprise any number of conductors now generally employed, and over the line energy may be conveyed at any current of voltage that may be selected. Such power lines generally have a conductor usually called a "ground wire", strung along the tops of the posts 1 above the conductors 4, and connected through each of the posts to the ground. Such a conductor serves to protect the line against damage by lightning and for other purposes; and in the practice of my invention, I may employ this conductor, or I may, as illustrated, mount in similar position a coupling conductor or wire 5 which is suitably supported on a number of successive posts by means of insulators 6, one end of this coupler wire 5 being attached to the top of one of the posts without insulation, so as to ground it, this wire being insulated from all the other posts by which it is supported; and the other end leads to an oscillating or alternating current circuit condenser 7 in series with a secondary winding 8, one end of which is earthed, so as to make the coupling device, in effect, a closed circuit or loop, extending from the end which is grounded through one of the posts, and back through the opposite grounded end, and the secondary 8 and condenser 7.

Co-operating with the secondary circuit is another oscillatory circuit 9 of a transmitting apparatus 10. When this apparatus is energized, oscillations will be induced in the coupling wire 5; and as this wire is in coupled relation with respect to the conductors 4 of the power line, oscillations will be induced in the conductors 4 and will travel along the same to any point at which a receiving set may be suitably connected.

If a grounded lightning conductor is already installed, then this conductor is insulated for a suitable length, which may be ¼ of the wave length of the oscillations to be transmitted from the power station or location of the sending apparatus; so that this grounded wire, while connected to grounded points along the line, is held up adjacent to the apparatus, on insulators for this comparatively short distance. Or, if a separate coupling conductor 5 is used, as shown in the drawings, it can be installed on the posts 1, grounded at one end and insulated along the line up to connection with the transmitting devices. The insulated end is connected to the oscillating or sending circuit, the other end of the oscillating circuit being grounded, forming a closed oscillating circuit or loop.

I prefer to ground the coupling wire 5 through one of the posts which are usually of metal, although the grounding in this way is not absolutely necessary. With a grounded coupling wire, in the event of the coupling wire ever making contact with one of the power conductors 4, any discharge through the coupling wire will be conducted away into the earth and no damage to the transmitting apparatus or injury to the operator can result. When a grounded coupling wire is used it operates the same as the usual "ground wire" so far as protecting the power line is concerned.

I do not limit myself to any specific length of coupling wire 5. It may be insulated for several spans or posts, or grounded at each span, depending upon the characteristics of the power line, and the signalling apparatus used.

The energy or impulses sent through the coupled conductor 5 are transmitted along the conductors 4 of the power line and can be received at any point desired upon a similar conductor $5^r$. This conductor is mounted in the same way as the conductor 5 upon the posts 1. It has one end grounded upon one of the posts, and is carried upon the tops of several other posts and insulated therefrom. The other end is joined through a conductor 11, through a coil 12 and condenser 13 in series, one end of the condenser being earthed. Inductively related to the coil 12 is another coil 14 which may be connected to suitable apparatus indicated at 15, for receiving signals or intelligence if impulses are transmitted for that purpose. If desired, the apparatus 15 may include a relay for controlling an additional circuit. This circuit may be a work circuit or a load circuit of any kind supplied with energy or power from the conductors 4, as indicated by a transformer comprising coils 16 and 17, the coil 17 being shown as joined to the apparatus 15 and having in its circuit translating devices 18. Hence, if the work circuit containing the devices 18 is such that they are to be controlled from a remote point, the operator having charge of the apparatus 10 can send impulses at will along the power line and these impulses will be received by the conductor $5^r$, and through it the circuit containing the devices 18 can be supplied with power from the line and made to operate at any time desired. Thus the circuit of the devices 18 can be controlled from the point at which the apparatus 10 is situated. Any desired method of uniting the circuit containing the devices 18 to the power line so that it can be controlled as desired, can, of course, be adapted.

In Figure 2, the coupling conductor $5^r$ is shown as provided with a coil 19 in inductive relation to another coil 20 united by conductors 21 to a condenser 22, and including in circuit apparatus 23, for receiving signals or intelligence, or having conductors 24 so related to the apparatus 23, that a work circuit can be controlled from the remote point at which the apparatus 10 is located, in the same manner as before.

If I employ the usual grounded lightning conductor which extends along the tops of the posts 1, this conductor will be insulated from some of the posts at both the sending and receiving ends by insulators 6, the same as the conductors 5 and $5^{\prime r}$. In that case, the lightning conductor, which will be made to serve the same purpose as the conductor 5, will be arranged in a suitable manner with respect to the supports 1, as will be obvious to those skilled in this art. For example, the lightning conductor may be interrupted say at the left side of the point in Figure 1 where it is joined to the coil 8, or it may continue past this point to the left and be supported on insulators similar to the insulators 6 for a considerable distance in the other direction, as well as to the right in Figure 1, and the same method of arranging this lightning conductor so as to make it serve the purpose of the conductor $5^{\prime r}$ at a distant point, will be utilized. When my invention is used for remote control of a work circuit, the current taken from the power line to supply this work circuit can be rectified, if desired.

Having described my invention, what I believe to be new and desire to secure and protect by Letters Patent of the United States is:—

1. The combination of transmitting apparatus, a conductor to receive electrical oscillations from said apparatus, a power line, and supports therefor, and insulators for the conductor, said conductor being mounted in coupled relation, upon said posts, to the line and being grounded through one of said posts.

2. The combination of transmitting apparatus, a conductor having a winding and a condenser to enable oscillations to be created in said conductor by the action of said transmitting apparatus, the end of said conductor adjacent said apparatus being grounded, a power line, supports for carrying said power line, the conductor being disposed in coupled relation to said power line, and insulators for mounting said conductor upon some of said posts, the opposite end of said conductor being grounded through one of said posts.

3. The combination of a power line, supports for said line, a conductor on some of said supports, said conductor being grounded at one end, and transmitting apparatus connected to the other end of said conductor, and making with said conductor and ground connection a closed loop.

4. The combination of a power line, supports for said line, a conductor extending along the tops of said supports above the power line, insulators for said conductor, one end of the conductor being grounded through one of the supports, and transmitting apparatus for the other end of said conductor.

5. The method of sending communications over a power line which consists in connecting transmission apparatus to a conductor mounted upon the supports for said line in inductive relation to said line and grounded upon one of said supports, so that oscillations from said transmitting apparatus can traverse said power line.

In testimony whereof I affix my signature.

WILLIAM DUBILIER.